Oct. 26, 1971  M. H. FELDMAN  3,614,947
ARROW PROJECTING DEVICE WITH ARROW RETRIEVING MECHANISM
Filed Sept. 26, 1969  2 Sheets-Sheet 1
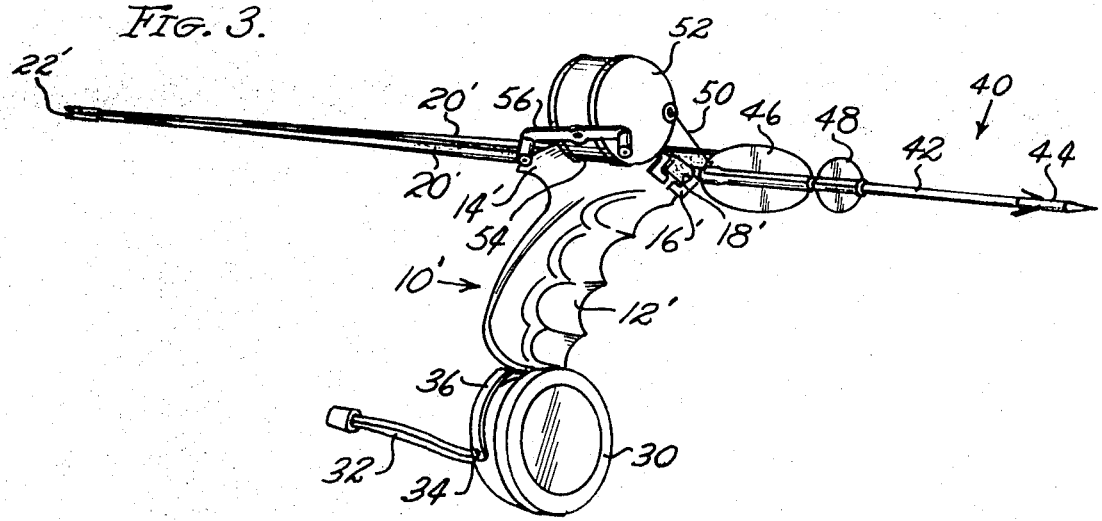
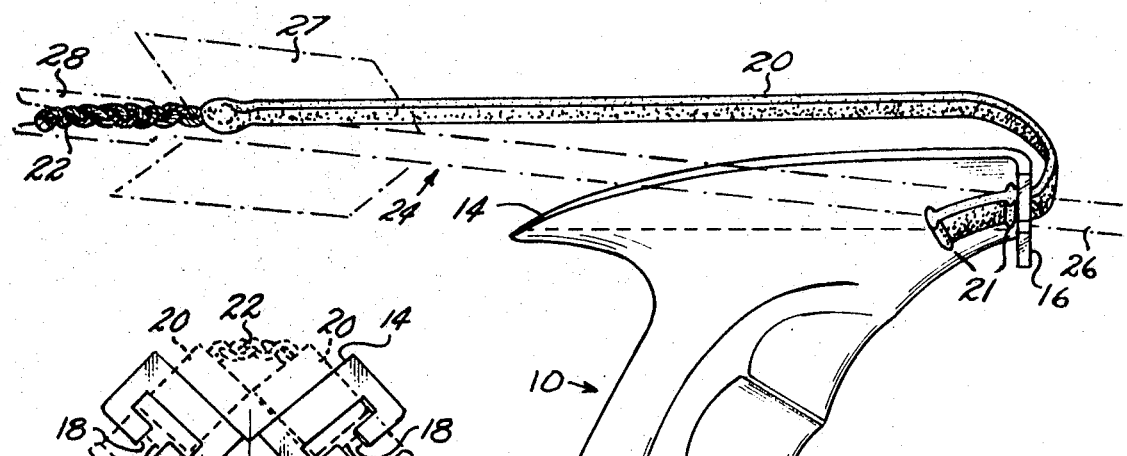
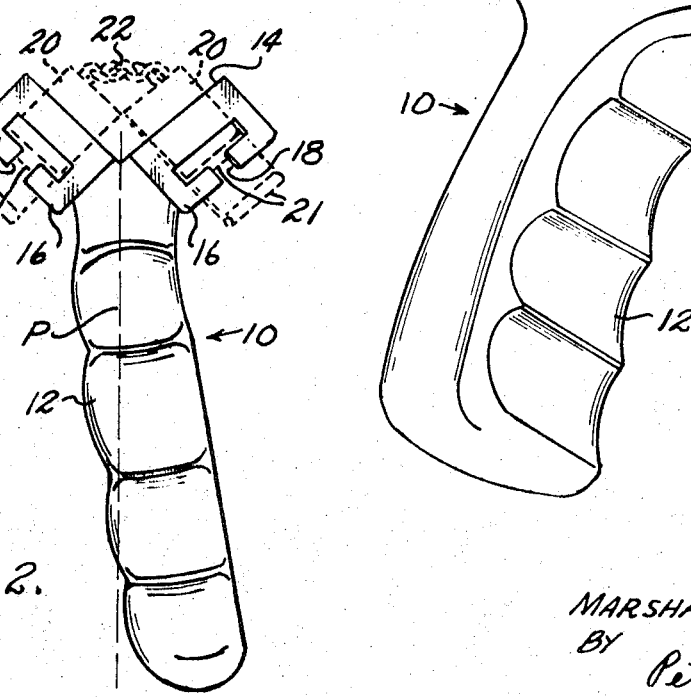
INVENTOR
MARSHALL H. FELDMAN
BY Peter H. Firsht
Attorney Oct. 26, 1971 M. H. FELDMAN 3,614,947
ARROW PROJECTING DEVICE WITH ARROW RETRIEVING MECHANISM
Filed Sept. 26, 1969 2 Sheets-Sheet 2
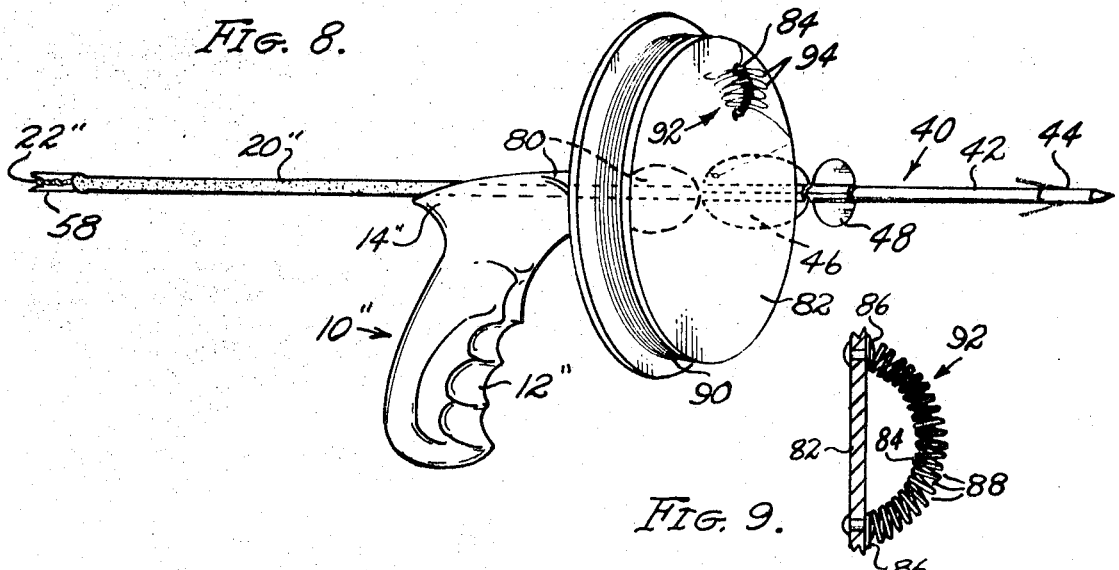
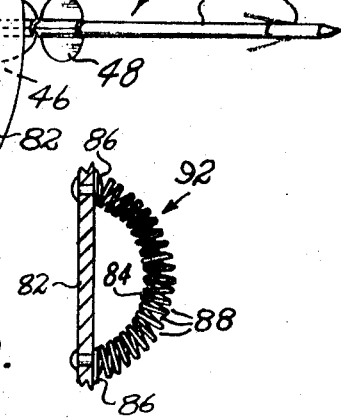
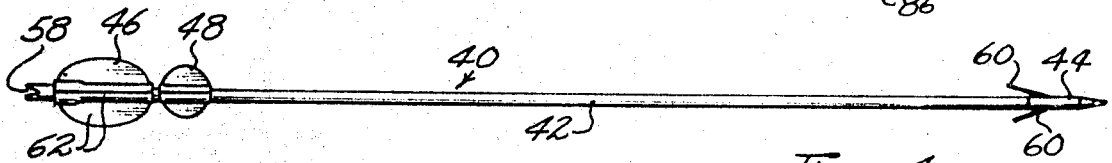
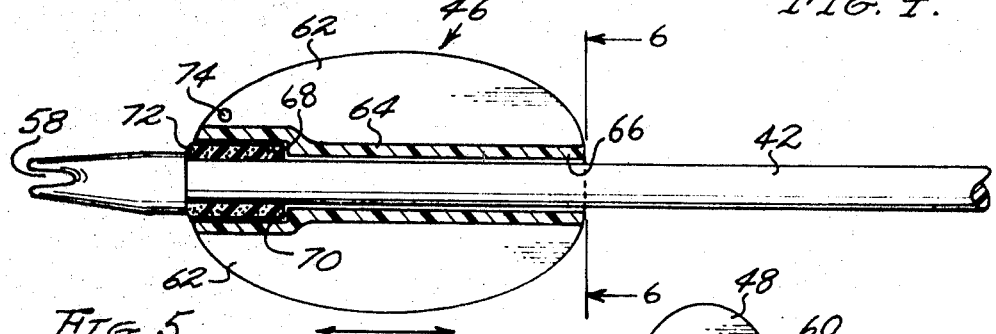
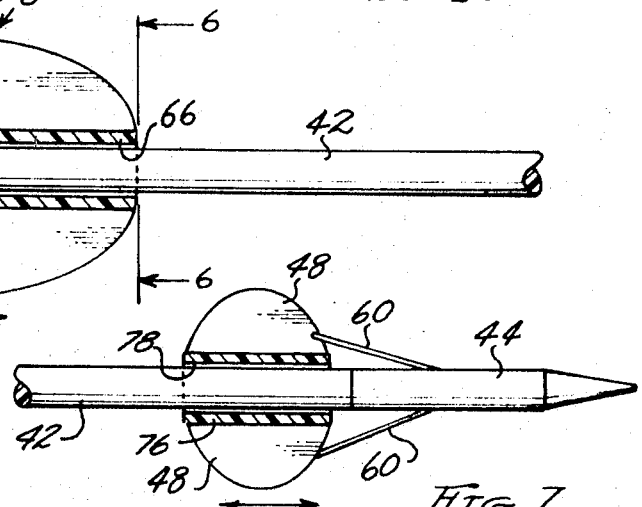
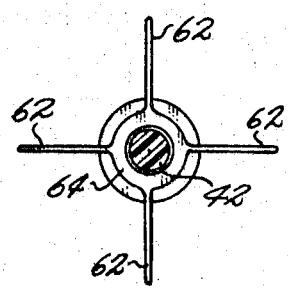
INVENTOR
MARSHALL H. FELDMAN
BY
Peter H. Firsht
Attorney

United States Patent Office 3,614,947
Patented Oct. 26, 1971

3,614,947
ARROW PROJECTING DEVICE WITH ARROW
RETRIEVING MECHANISM
Marshall H. Feldman, P.O. Box 922,
Twenty-Nine Palms, Calif. 92277
Filed Sept. 26, 1969, Ser. No. 861,261
Int. Cl. F41b 7/00, 7/04
U.S. Cl. 124—20               11 Claims

ABSTRACT OF THE DISCLOSURE

A sling handle topped by a trough member adapted to support an arrow and guide the fletching thereof. Elastic bands detachably adjustably secured to the front of the member have rear ends interconnected by a short cord receivable in an arrow nock. A drum mounted to the side of the member supports a coil of retrieving line which is connected to the arrow. A light on the lower end of the handle illuminates the target when the sling is aimed thereat. A retrievable arrow has a barbed head and slidable fletching to which the retrieving line is connected for forwardly disposing a section of the line between the arrow and the drum in the interests of safety. Slidable vanes on the arrow shaft shield the arrowhead to prevent snagging upon retrieval.

BACKGROUND OF INVENTION

The present invention relates to target practice, hunting and fishing with use of arrows, and more particularly to a device for launching arrows in such sporting endeavors. The present invention also contemplates the provision of an arrow especially adapted to the capture of fish and having novel features for the attachment of a retrieving line and for preventing snagging during retrieval. Additionally, accessories are provided for day or night fishing with arrows.

With the liberalization of game laws for hunting or fishing with arrows, bow hunting and bow fishing have come to the fore, and many innovations have been made in the bows and arrows to provide for the attachment and paying out of a retrieval line. For example, in commercially available accessories for converting a bow to fishing, a leader is tied to the arrowhead, or point, and is brought back through a perforation just in front of the nock in the butt end of the arrow. The leader is then secured to the retrieval line which is wound or coiled around a stationary drum, adapted to be taped to the bow, the line passing through a spring wire holder in front of the drum. The drum has a relatively large diameter to help protect the hand of the bow fisher while retrieving the line and winding it on the drum. In order that the line can unwind freely from the drum, a pull on the line must be exerted from a point sufficiently in front of the drum. For this reason, a section of loose line is provided between the holder and the arrow so that as the arrow is sped on its way the line is properly disposed for pulling away from the holder and unwinding freely. However, in pulling the arrow back, preparatory to shooting it, the section of line between the arrow and the drum forms a loose loop disposed along the archer's arm holding the bow. This creates a dangerous situation which numerous articles and instructions on bow fishing caution against to avoid tangling and injury to the fisherman; sometimes of a quite serious nature. The hazards become even greater when such gear is used at night or in brush or undergrowth. Also, during flight the arrow turns, causing twisting and kinking of the retrieval line which has an adverse effect on the accuracy of the arrow.

For night fishing, a light mounted on a head band has been used. Such lighting is not completely satisfactory because oftentimes one must turn his head to one side in order to sight the target and the weight of the light makes such movement awkward. Also, the light is not always directed on target.

Bow fishing on the banks of streams which are rank with reeds, weeds, or brush is practically impossible because of entanglement of the bow and line therewith. Furthermore, although the line is intended for retrieval of the fish and arrow, or of the arrow alone when the quarry is missed, success is not necessarily the order of the day. This is because conventional arrows used for fishing are barbed and have no provision thereon to prevent snagging during retrieval. Moreover, the commercially available drum usually has only a relatively short length of line, about 25 yards, which line, of necessity, must be quite strong, about 75 lb. test, in order to be able to stop and turn a fish of any size in such a short distance. When struck by the arrow, the fish ordinarily takes off at great speed and the shortness of the line often results in the arrow being pulled out with attendant loss of the fish, which usually dies later. Such gear thus also lacks the ability to play the fish and slow it down.

There are also commercially available hunting slingshots which are primarily designed to propel small objects as missiles, including stones, marbles, steel balls, ball bearings, and the like, for which purpose the slingshot is provided with a leather pouch and elastic bands. The manufacturer of one such slingshot claims that it has tremendous killing power up to 225-yard range. Another purportedly permits the shooting of all kinds of standard arrows—hunting or target. Each provides a generally Y-shaped bifurcated member, the lower part of which is adapted to be gripped by hand. Elastic bands with an intermediate pouch are attached to the bifurcations and extend rearwardly therefrom.

In shooting an arrow with the hunting slingshot, a makeshift crosswise or upstanding flap is disposed between the bifurcations and provides a support for the arrow shaft. The butt end of the arrow is placed in the pouch and its shaft is disposed between the bifurcations and over the support. With one hand gripping the bifurcated member, the thumb and finger of the other hand press the sides of the pouch about the butt end to hold it, while pull is exerted on the elastic bands to tension them for launching the arrow. There is no positive way of insuring that the arrow is properly disposed in the plane defined by the tensioned bands. This, coupled with the possibility of slippage of the arrow in the pouch, can lead to inaccurate and improper launching of the arrow from which dangerous situations can and sometimes do result. In addition, the makeshift support has a harmful effect on the feathers or fletching of the arrow, often tearing or shearing off the lowermost feather. This, of course, also affects the accuracy of the arrow.

SUMMARY OF INVENTION

It is therefore an object of the present invention to provide a novel improved device for shooting arrows which is simple and economical in construction and reliable in operation.

Another object of the invention is to provide an improved sling which can accommodate a variety of arrows and launch them into flight with great power and accuracy.

A further object is to provide an improved sling for shooting a novel arrow which is especially adapted to capturing fish.

A still further object is to provide a novel arrow which is retrievable and has novel means for connecting a retrieving line thereto.

Still another object is to provide a retrievable arrow which has means for preventing snagging of the arrow during retrieval.

Still another object is to provide a sling which supports a substantial length of retrieving line in a manner minimizing entanglement of the line and reducing the danger of injury to the shooter.

Still another object is to provide means for the free unwinding of the retrieving line.

Still another object is to provide a sling having means for directing a light on a target simultaneously with aiming.

These and other objects and advantages are achieved by the provision of a sling having a handle topped by a V-shaped through member inclined in the direction of flight of an arrow and serving to support the shaft of the arrow. A pair of elastic bands are detachably adjustably secured to the forward edge of the trough member and extend back over the member for engagement with the butt end of the arrow by means of a short flexible cord interconnecting the rear ends of the bands and receivable in a nock in the butt end. A drum is mounted to the side of the trough member and supports a coiled length of retrieving line for unwinding freely. The line is connected to a retrievable arrow by means of fletching slidably mounted on the arrow shaft so that a leading section of the line between the arrow and the drum can be disposed ahead of the sling for reducing the danger of entanglement and injury to the shooter. The arrow also has slidable vane means which shield the head or point of the arrow for preventing snagging during retrieval. An adjustable light is mounted on the lower end of the handle so that a target can be illuminated simultaneously with aiming of the sling.

BRIEF DESCRIPTION OF THE DRAWINGS

FIG. 1 is a side elevational view of a device embodying the principles of the present invention.

FIG. 2 is a front elevational view of the device of FIG. 1.

FIG. 3 is a perspective view of another device embodying the principles of the present invention, complete with attachments and a novel retrievable arrow in accordance with the invention.

FIG. 4 is a side view of the novel retrievable arrow, better illustrating the barbed head thereof, and showing the positions of the slidable fletching and vanes thereof during flight of the arrow.

FIG. 5 is an enlarged fragmentary view of the butt end portion of the arrow of FIG. 4, partly in section, illustrating the slidable fletching and bumper.

FIG. 6 is a vertical sectional view on line 6—6 of FIG. 5.

FIG. 7 is an enlarged fragmentary view of the head end portion of the arrow of FIG. 4, partly in section, illustrating the slidable vanes engaged with the barbed head for preventing snagging during retrieval.

FIG. 8 is a perspective view of another device embodying the principles of the present invention with the novel retrievable arrow to which is connected a retrieving line, the main body of the line being coiled on a stationary drum for free unwinding and a leading section of the line being supported on the drum in a loose compact mass by a coil spring to facilitate free unwinding and minimize entanglement.

FIG. 9 is an enlarged fragmentary view illustrating the arched configuration of the coil spring of FIG. 8.

DESCRIPTION OF EMBODIMENTS

Referring to the drawings, there is shown in FIG. 1 a device embodying the principles of the present invention in the form of a sling 10 which includes a pistol grip handle 12 topped by a trough member 14 open at both ends. As also shown in FIG. 2, the member 14 is V-shaped and is provided with forwardly disposed depending portions or flanges 16 in which T-shaped slots 18 are formed. The slots are adapted to receive the forward ends of a pair of bands 20 of elastic material such as surgical gum rubber or the like. The forward ends of the bands are provided with spaced enlargements or nodes 21 for adjusting the effective tensionable length of the bands. The rear ends of the bands are connected by a short flexible line or cord 22.

The elastic bands 20 are adapted to extend back over the trough member 14 and receive, for launching, an arrow 24, fragmentarily shown in phantom. The arrow has a shaft 26, which is supported by the front end of the trough member, feathers 27 and a nock end 28 in which the cord 22 is received.

Preferably, the handle 12 and trough member 14 are fashioned to dispose the upright axis of the handle obliquely at an angle of about 10 degrees with respect to a plane P bisecting the trough member symmetrically so that when the trough is properly disposed for shooting an arrow, the handle fits into the hand of the shooter naturally and comfortably. The trough is also disposed so that the longitudinal axis thereof is at an angle of about 65 degrees with respect to the handle axis, whereby the trough is inclined forwardly and provides a smooth guide for the arrow feathers. It is understood, of course, that the sling 10 can be formed to suit the particular dexterity of the shooter. The sling shown in FIGS. 1 and 2 is adapted to be held in the left hand of the shooter.

The operation of the sling 10 is believed to be clearly apparent and is briefly summarized at this point. With one hand holding the handle 12, the other hand is employed to place the arrow 24 between the bands 20 with the cord 22 received in the nock end 28 of the arrow. Thumb and finger pressure is then applied to the arrow nock end and cord to pull back the arrow and tension the bands, the arrow shaft 26 being supported by the front end of the trough member 14. The sling and arrow are then aimed at the target and upon release of the aforementioned finger and thumb pressure the arrow is launched thereat, the trough member serving to guide the arrow without harm to the feathers thereof.

FIG. 3 shows a sling 10' which is substantially similar to the sling 10 and has corresponding parts referenced by primed numerals. Thus, sling 10' has a handle 12', a V-shaped trough member 14', and flanges 16' with T-slots 18' which adjustably receive the front ends of elastic bands 20'. A flexible line or cord 22' interconnects the rear ends of the bands.

Adjustably mounted on the lower end of the handle 12' is an electric light 30, powered by a battery, not shown, and connected thereto through a connector cord 32. Preferably, the battery is carried on a waist belt which can be easily disconnected in the interests of safety. The light is provided with diametrically disposed pivot pins 34 which are frictionally adjustably supported in the ends of an inverted U-shaped bracket 36. The bracket, in turn, is connected to the handle by a thumbscrew, not shown, for adjustment about an upright axis. Thus, by selective positioning of the bracket with respect to the handle, and of the light with respect to the bracket, the light can be adjusted to illuminate a target upon aiming the sling 10' thereat. The provision of a light on the sling is optional.

FIG. 3 also shows a novel retrievable arrow 40 in accordance with the present invention which has a shaft 42 and a head 44 but is unique in that fletching 46 and vanes 48 are mounted for sliding on the shaft. Connected to the fletching is a retrieval line 50, the main body of which is housed within a conventional closed-faced reel 52 having a rotatable drum, not shown, about which the line is wound or coiled for freely unwinding in response to a forward pull on the line. The reel is mounted on a flange 54 at one side edge of the trough member 14' and is equipped with a crank 56 which is conveniently coupled to the rotatable drum for winding the line thereon in playing a fish and retrieving it. Of course, the arrow can be launched at either game or practice targets and serve as an aerial target for practice purposes. The line can serve to pull in the arrow or lead the shooter to its whereabouts.

Inviting attention to FIG. 4, the arrow 40 is shown with the fletching 46 and vanes 48 thereof slid to the butt end of the shaft 42, which end is provided with a nock 58. The head 44 of the arrow is provided with a pair of prongs or barbs 60 which are flexible or elastic and permit easy ingress into the body of the fish or other quarry and tend to spread outwardly upon a backward pull on the arrow.

As better seen in FIGS. 5 and 6, the fletching 46 is provided with a plurality of vanes or fledges 62 which perform a function similar to that of the usual feathers provided on conventional arrows for guiding the arrow in flight; except that the fledges are disposed in planes which intersect at the axis of the arrow shaft for true accurate flight of the arrow, rather than angled thereto as arrow feathers usually are. The fledges 62 extend radially in planes intersecting at the axis of the arrow shaft 42 and are mounted on a sleeve 64 having a bore 66 in which the arrow shaft is received. The bore 66 is of suitable size for free turning and sliding of the fletching 46 relative to the arrow shaft. The sleeve also has a larger bore 68 coaxial with the bore 66, with a shoulder 70 therebetween. The shoulder is adapted to engage a bumper sleeve 72 of rubber or other material for limiting the rearward sliding of the fletching 46 which in turn limits the rearward sliding of the vanes 48. Bore 68 has a diameter that is slightly larger than that of the bumper sleeve.

At least one of the fledges 62 has a perforation 74 therethrough which is located adjacent the sleeve 64 to be as close as possible to the longitudinal axis of the arrow shaft 42. The leading end of the retrieval line 50 is passed through the perforation for tying the line to the fletching 46. The free turning of the fletching and the planar form of the fledges prevent twisting and kinking of the line and make for greater accuracy in the flight of the arrow 40.

After the arrow 40 strikes the quarry and a pull is exerted on the line 50 for retrieval thereof, the vanes 48 slide against the quarry and serve to deflect any weeds or debris encountered during retrieval. For this reason, the edges of the vanes 48 and of fledges 62 are preferably curved convexly longitudinally. The vanes 48 are particularly effective to prevent snagging of the prongs or barbs 60 should the quarry be missed. In such case, during retrieval the vanes 48 engage the barbs and are configured to have a greater lateral extent than the barbs for clearing a path of sufficient extent to preclude snagging of the barbs. As shown in FIG. 7, the vanes 48 are mounted on a sleeve 76 and radiate therefrom diametrically. The sleeve 76 has a bore 78 in which the arrow shaft 42 is slidably turnably received.

In the operation of the sling 10', the arrow 40 is supported thereon with the cord 22' in the nock 58. The arrow is drawn back with the requisite thumb and finger pressure to dispose the fletching 46 immediately to the front of the trough member 14 in order that the leading section of the retrieval line 50 be as short as possible. The sling and arrow are aimed at the target, release of the thumb and finger pressure launching the arrow into flight, whereupon the fletching 46 and vanes 48 slide to the rear. When the fletching strikes the bumper 72, a forward pull is exerted on the retrieval line 50 for freely unwinding the main body thereof from the reel 52. After the quarry has been struck, or been missed, the crank 56 is turned to wind in the retrieval line and pull in the arrow with or without the quarry, as the case may be. The vanes 48 usually slide up towards the head end 44 of the arrow and in the absence of a quarry engage the barbs 60 and clear a path for the same.

FIG. 8 shows still another sling 10" embodying the principles of the present invention and having parts similar to the sling 10, such as a handle 12", a V-shaped trough member 14", and forward flanges with T-slots, not shown, to which the forward ends of elastic bands 20" are adjustably connected, the rear ends of the bands having an interconnecting cord 22". The cord is adapted to be received in the nock end 58 of the novel arrow 40. The trough member 14" has a laterally extending bracket 80 on which is mounted a drum 82 having a convoluted or coiled spring 84 on the forward face thereof. The spring has ends 86 fixed to the drum so as to bend the spring into an arch-like configuration, as shown in FIG. 9, whereby the coils or convolutions of the spring are spread to provide recesses or notches 88. Wound about the drum is a retrieval line 90 having a leading section 92 formed into small loops 94 releasably held in the recesses 88. The leading end of the retrieval line is connected to the fletching 46 which is disposed next to the trough member when the arrow 40 is drawn back for launching. When the arrow is launched into flight, the fletching slides rearwardly on the shaft 42, continued flight of the arrow pulling the leading section 92 of the retrieval line out, loop by loop, until the leading section is straightened out and a sufficient length of the line is forwardly of the drum 82, whereby the line 90 unwinds freely therefrom.

There has thus been provided a novel device useful for safely, properly and accurately launching arrows of various types, which device is relatively inexpensive, light, compact and easily portable through brush and tangled undergrowth, making it easy to fish in areas in which it is impossible to fish with a bow and arrow because of entanglement. The invention also provides a novel arrow equipped with parts to cause the arrow to have true flight and be snagproof upon retrieving.

Although the invention has been herein shown and described in what are believed to be the most practical and preferred embodiments, it is recognized that various modifications and changes can be made in the practice of the invention, which is not to be limited to the details disclosed herein.

What is claimed is:

1. A device for launching a retrievable arrow, comprising:
    a handle,
    a retrievable arrow with a rubber bumper collar adjacent the end of the arrow,
    an elongated bifurcated member atop the handle having a portion engageable with the missile for supporting and guiding the same, and
    elongated tensionable means secured to the bifurcated member and extendable rearwardly over the missile-supporting portion for engagement with the rear end of the missile to launch it into flight,
    a line holding means mounted on the handle, a length of line wound on said line holding means and connected to said retrievable arrow, said retrievable arrow having a means slidably mounted thereon for guiding and stabilizing the arrow in flight, a free end of said line being attached to said means, said rubber bumper collar being a limit stop for the means in the latter's rearward travel during the arrow's flight, and said means having an inner recess to house the rubber bumper when said means and said bumper are in engagement.

2. The device of claim 1 in which the bifurcated member is a V-shaped trough.

3. The device of claim 2 in which the tensionable means are secured to the trough at spaced points on the front end thereof.

4. The device of claim 3 in which the trough is provided with depending portions having T-slots therein for detachably securing the tensionable means thereto.

5. The device of claim 4 in which the tensionable means include a pair of elastic bands having forward ends received in the T-slots and rear ends interconnected by a short cord-like line adapted to be received in a nock in the rear end of the arrow.

6. The device of claim 3 wherein the tensionable means comprises elastic bands which have forward ends with spaced enlargements selectively disposed with respect to the spaced points on the trough for adjusting the effective tensionable length of the bands.

7. The device of claim 1 wherein said line holding means include a drum mounted to the side of the trough and having an axis which is generally parallel to the arrow being launched.

8. The device of claim 1 in which line-receiving recesses are supported adjacent of the drum for holding a section of the line between the arrow and the drum, said section of the line being formed into small loops releasably held in the recesses, whereby the section of line is compacted for minimizing entanglement of the line and reducing the danger of injury to the shooter.

9. The device of claim 1 in which the line-holding means include a convoluted spring bent into an arch-like configuration for spreading some of the convolutions thereof to provide said line-receiving recesses.

10. The device of claim 1 in which the drum is part of a closed face type reel.

11. The device of claim 1 in which a light is adjustably mounted on the lower end of the handle for directing light at the target.

References Cited

UNITED STATES PATENTS

| | | | |
|---|---|---|---|
| 2,938,514 | 5/1960 | Berg | 124—30 BX |
| 3,157,962 | 11/1964 | Bonnelly | 273—58 CX |
| 3,415,239 | 12/1968 | Swett | 124—22 X |
| 3,340,642 | 9/1967 | Vasiljevic | 43—6 |

RICHARD C. PINKHAM, Primary Examiner

W. R. BROWNE, Assistant Examiner

U.S. Cl. X.R.

124—30 B, 30 R; 43—6; 273—106.5 B, 106.5 C